(12) United States Patent
Marioni

(10) Patent No.: US 7,399,407 B2
(45) Date of Patent: Jul. 15, 2008

(54) PRESSURE FILTER FOR AQUARIOLOGY

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 288 days.

(21) Appl. No.: 11/237,518

(22) Filed: Sep. 28, 2005

(65) Prior Publication Data
US 2006/0157395 A1 Jul. 20, 2006

(30) Foreign Application Priority Data
Sep. 30, 2004 (EP) .................... 04425734

(51) Int. Cl.
*B01D 29/64* (2006.01)
*A01K 63/04* (2006.01)
(52) U.S. Cl. ............... 210/167.25; 210/413; 210/415
(58) Field of Classification Search ......... 210/167.21, 210/167.25, 407, 413, 415, 416.1, 416.2, 210/500.28; 119/259
See application file for complete search history.

(56) References Cited

U.S. PATENT DOCUMENTS 1,548,160 A * 8/1925 Newman ............... 210/266
4,883,587 A * 11/1989 LeVeen et al. ............. 210/94

FOREIGN PATENT DOCUMENTS

| CH | 394 124 A | | 6/1965 |
| DE | 394124 | * | 11/1965 |
| DE | 43 07 472 A1 | | 11/1994 |
| DE | 4307472 | * | 11/1994 |
| DE | 196 30 652 A1 | | 2/1998 |
| DE | 19630652 | * | 2/1998 |
| FR | 2 234 913 A | | 1/1975 |
| FR | 2234913 | * | 1/1975 |
| GB | 2 007 104 A | | 5/1979 |

* cited by examiner

*Primary Examiner*—Fred Prince
(74) *Attorney, Agent, or Firm*—Akerman Senterfitt

(57) ABSTRACT

Pressure filter for aquariology for retaining impurities of the water intended for ponds, aquaria and the like, of the type comprising a glass-like container (12) closed by a cover (14), a liquid path (15) extended in the container between an inlet opening (16) and an outlet opening (17), a filtering body (18) placed along the path and having an exposed surface (19) whereon the impurities are retained, and at least a brushing element (31) mounted in the container in a guided way with to-and-from movement along the exposed surface (19) for removing the impurities, characterized in that the brushing element (31) is mobile against the exposed surface (19) for maintaining a pressing contact between the brushing element (31) and the exposed surface (19).

19 Claims, 4 Drawing Sheets

PRESSURE FILTER FOR AQUARIOLOGY

FIELD OF INVENTION

The present invention relates, in its more general aspect, to a pressure filter for aquariology, for retaining impurities of a liquid intended for ponds, aquaria and the like.

The filter is of the type comprising a substantially glass-like or beaker-like container closed by means of a cover, a liquid path extended in the container between an inlet opening and an outlet opening, and a filtering body arranged along the liquid path and having a surface exposed to the liquid whereon the impurities are retained.

In particular, the pressure filter according to the invention is provided with means for cleaning the filtering body, which comprise a brushing element mounted in the container in a guided way with to-and-from movement along the exposed surface.

The following description is made with reference to a brushing element for simplifying the disclosure only, it is however clear that with the term brushing element generally means an element able to scrape or scratch the exposed surface thanks to a continuous and alternated movement.

BACKGROUND OF THE INVENTION

As it is well known in this technical field, the pressure filters of the above mentioned type mainly perform the function of mechanically filtering the water, by removing the impurities such as the suspended material, the particulate and the filth particles. Normally this function is performed by a series of sponges, realized with expanded plastic material with communicating cells, preferably with polyurethane.

For taking care of the cleaning of the filtering elements without having to resort to the opening of the filter, technical solutions have been developed for long intended to compress the filtering sponges, so as to free them partially or totally from the particulate material entrapped therein.

In other technical fields, for cleaning the exposed surface of the filtering elements the use of brushing elements has been for long spread. These latter act substantially as a racla, which is guided in a sliding way with a to-and-from movement along the exposed surface of the filtering body.

Although advantageous under several aspects, known filters, which use sponges with open cells as filtering elements, have a still unsolved drawback.

The drawback stays in that, in spite of the use of the brushing elements, progressive volume variations and dimension reductions of the filtering element can be noted in time with an unavoidable worsening of the brushing element efficiency and increase of the load loss due to the obstruction.

In consideration of the drawback detailed above, an aim of the present invention is that of devising a pressure filter having such structural and functional characteristics as to ensure a high brushing element efficiency although occurring a progressive volume reduction of the filtering element.

A further aim of the invention is that of providing a pressure filter wherein the brushing element has high maneuverability and manoeuvre flexibility when cleaning the filtering element.

SUMMARY OF THE INVENTION

A first embodiment of the invention relates to pressure filter for aquariology for retaining impurities of a liquid intended for ponds, aquaria and the like, of the type comprising:

- a beaker-like container closed by a cover,
- a liquid path extended in the container between an inlet opening and an outlet opening,
- a filtering body placed along the path and having an exposed surface whereon the impurities are retained, and
- at least a brushing element mounted in the container in a guided way with a to-and-from movement along the exposed surface for removing the impurities, the brushing element being mobile against the exposed surface for maintaining a pressing contact between the brushing element and the exposed surface.

Further characteristics and advantages of the filter according to the invention will be apparent from the following description of an embodiment thereof, given by way of indicative and non-limiting example with reference to the annexed drawings.

DETAILED DESCRIPTION

Figure 1:
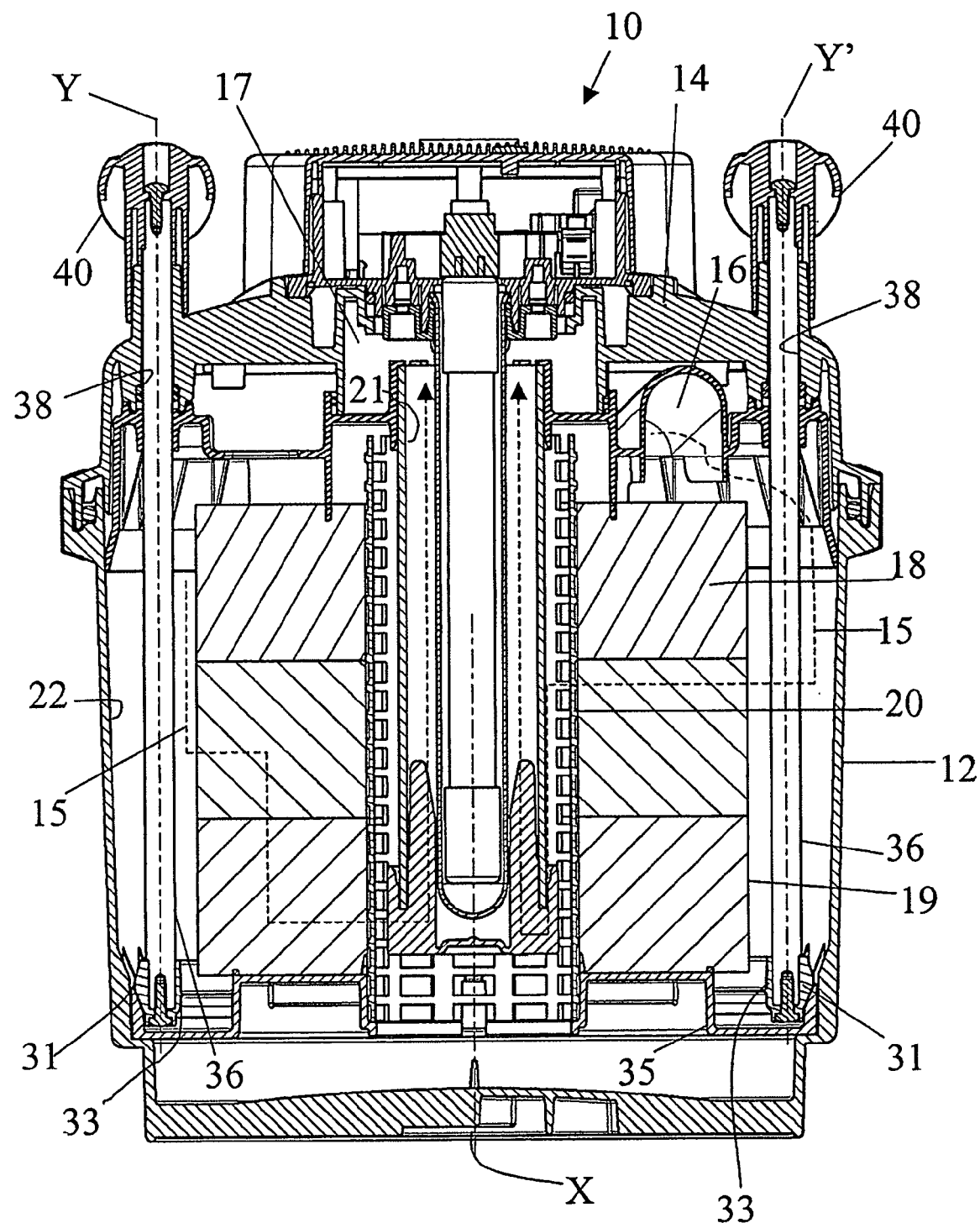
FIG. 1 shows a longitudinal section of a pressure filter realized according to the present invention.

With reference to these figures, 10 globally and schematically indicates a pressure filter for aquariology realized according to the present invention for retaining impurities of the water intended for aquaria or ponds.

The filter 10 is thus intended for uses, which provide the filtration of the water liquid, but nothing forbids that such filter can be used with other typologies of liquids.

The filter 10 comprises a container 12, of prefixed axis X and having substantially glass-like shape closed by means of a cover 14.

The filter 10 further comprises a fluid path, schematically indicated with the reference number 15, which is extended in the container 12 between an inlet opening 16 and an outlet opening 17.

In correspondence with the inlet opening 16 and with the outlet opening 17 the container 12 comprises an adduction fitting and, respectively, a feed fitting, of the known type and not shown in the drawings, for the connection with a pond, in case of use with re-circulation, or with a dump.

The filter 10 also comprises a filtering body 18 placed along the path 15 and having a surface 19 exposed to the liquid whereon the impurities of the water are retained.

In the specific case, the container 12 centrally comprises a grilled tube 20 in communication with the outlet opening 17 through a central conduit 21.

Around this grilled tube 20 the filtering body is housed which, in the here described example embodiment comprises a plurality of sponges 18 realized for example with polyurethane with open cell.

More in particular, the sponges 18 are circularly ring-like shaped and stacked one on the other around the grilled tube 20 to fill the container 12 and form an annular chamber 22 put in communication with the inlet opening 16.

It is also clear as a consequence that, in this embodiment, the above mentioned liquid path 15 extends, starting from the inlet opening 16, with a substantially radial direction from the annular chamber 22 towards the grilled tube 20 crossing the whole circular surface 19 of the sponges 18.

For cleaning the sponges 18, the filter 10 also comprises brushing means mounted guided inside the container 12 along the exposed surface with a to-and-from linear movement along an axis Y, and respectively Y', substantially parallel to the exposed surface.

In particular the brushing means comprise, in the specific case, two brushing elements 31, which can be housed in the annular chamber 22 on diametrically opposite parts with respect to the sponges 18.

Figure 3:
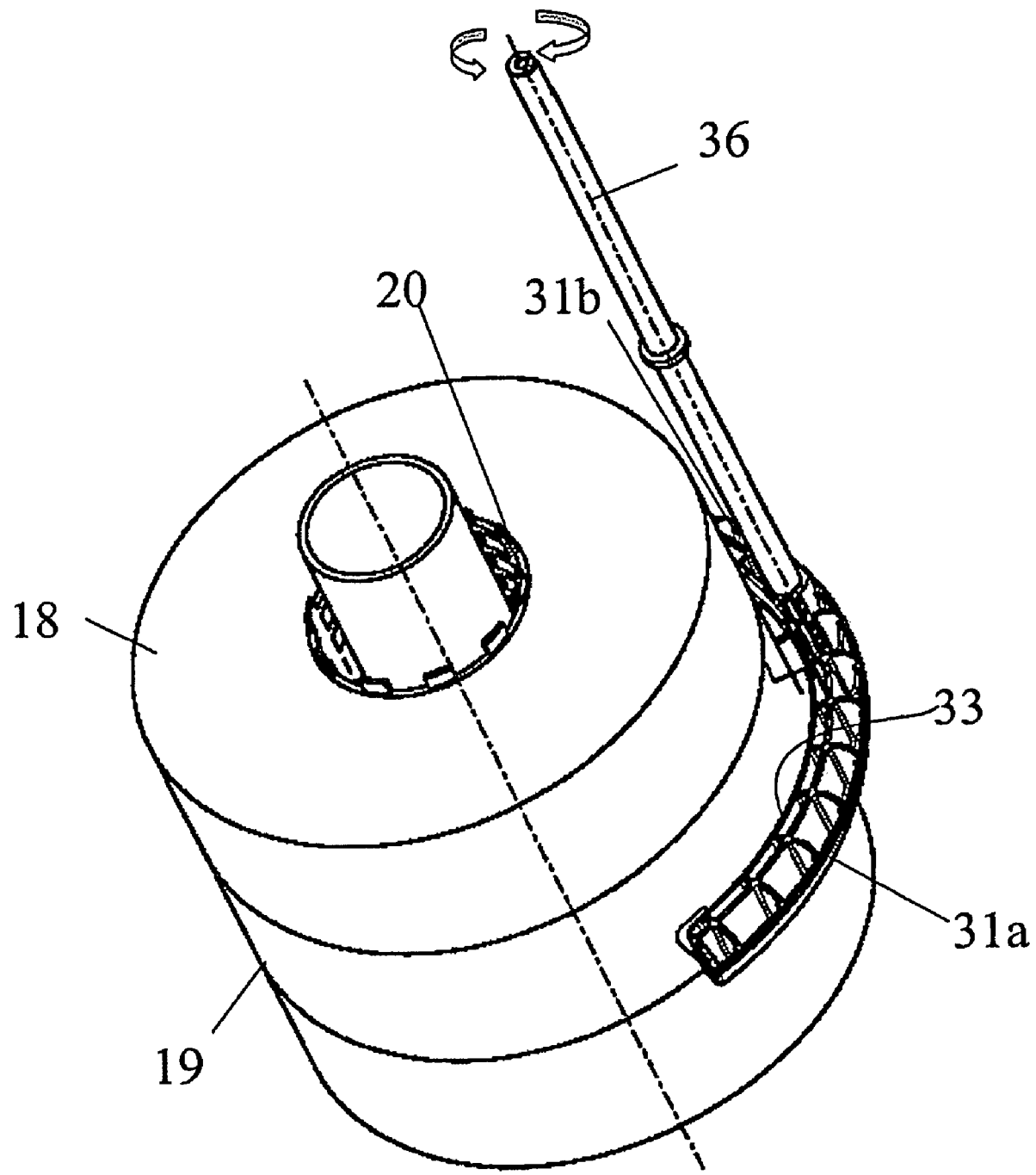
FIG. 3 shows a perspective view of a detail of the pressure filter of FIG. 1.
Figure 4:
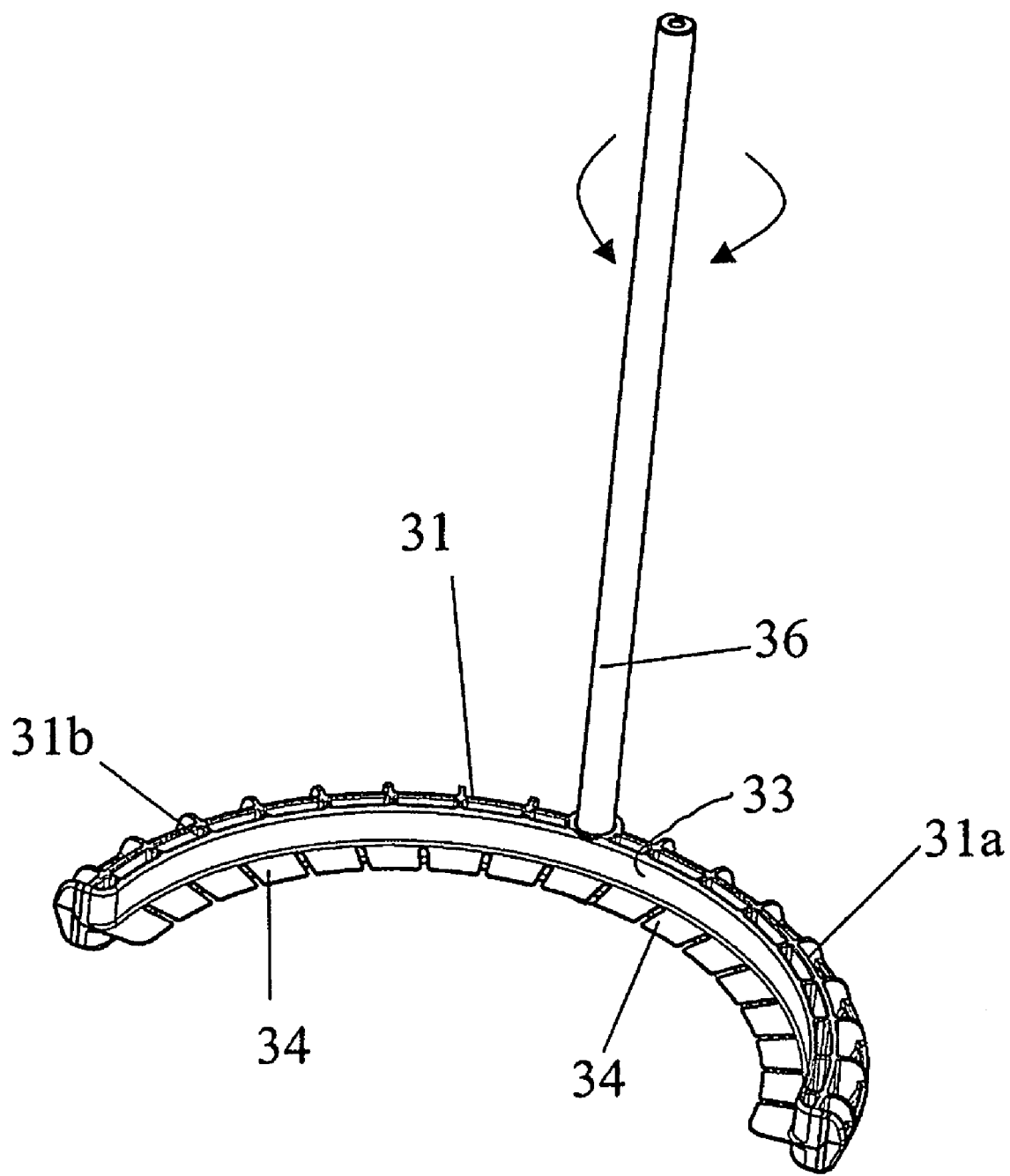
FIG. 4 shows a schematic view of a brushing element of the filter of FIG. 1.

Each brushing elements 31 is preferably shaped in the form of a semi-ring (FIGS. 3 and 4) and it comprises on a side 33 facing the surface 19 a plurality of tabs 34, flanked one with the other along the inside of the whole semi-ring 31. In practice they are two independent semi-rings 31 which coaxially surround the sponges 18, and substantially form a ring, which closes these latter.

According to the invention, each of the semi-rings 31, besides being guided in a sliding way along the surface 19, is mobile against the surface 19 for maintaining a pressing contact between this latter and the tabs 34. In other words, each of the semi-rings 31, besides being guided linearly along the surface 19, is also mobile toward the exposed surface 19.

Preferably, each semi-ring 31 is angularly mobile against the surface 19.

In particular, each semi-ring 31 is angularly mobile exactly around the above-mentioned same axis Y, and respectively Y', along which, as it has been said, it is guided with to-and-from movement.

In the specific case, for manoeuvre each semi-ring 31, the filter 10 comprises a pair of control rods 36 each of which is arranged swiveling around the axis Y and, respectively Y'.

In the specific case, the control rods 36 are mounted passing through respective calibrated holes 38, equipped with tight washer, which are made in the cover 14 of the filter 10.

Figure 2:
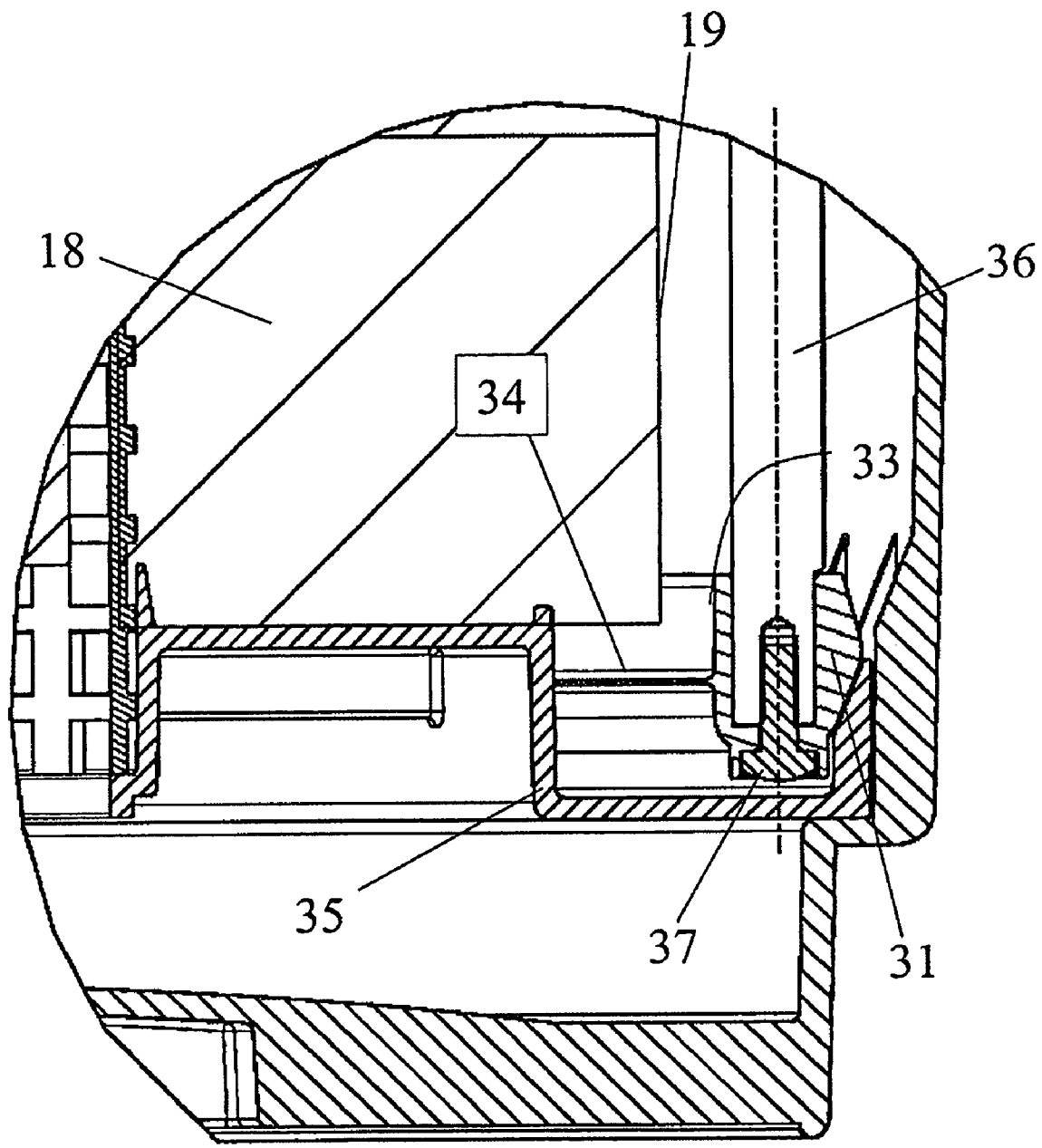
FIG. 2 shows an enlarged scale detail of FIG. 1.

A first end of the rod 36 is integrally fixed, substantially orthogonal, to the respective semi-ring 31. For the integration a pin 37 (FIG. 2) is for example provided.

A second end, opposite with respect to the first one, is placed outside the container 12 and it is associated with a grip handle 40.

By acting on the grip handle 40, each semi-ring 31 is thus mobile from a first position in correspondence with a bottom wall 35 of the container 12 and a second position near the cover 14, and at the same time it can be angularly moved around the axis Y and, respectively Y', for pressing against the exposed surface 19.

As it can be clearly seen in FIG. 1, the inner diameter of the two semi-rings 31 is smaller than the outer diameter of the sponges 18, and this allows to improve the brushing action against the surface 19.

The tabs 34 are also realized with plastic material and with the thickness of some tens of mm, so as to be flexible and to adapt both to the above to-and-from movement, and to the movement of the semi-ring 31 against the surface 19.

As it is possible to note from the drawings, each control rod 36 is also preferably fixed in a substantially mean and central area of the respective semi-ring 31, for dividing this latter in two portions 31a and 31b.

In this way, by means of alternated rotation of each rod 36 in a sense and in the other, it is possible to approach in turn the one and the other portion 31a, and respectively 31b against the exposed surface 19.

Thus, manually making the rods 36 rotate, the two semi-rings 31 rotate around the respective axes Y, Y' towards the surface 19 and they press now with the one, now with the other portion 31a and, respectively, 31b against the surface 19. In such a manner, each of the portion 31a, 31b is alternatively mobile toward-and-away with respect to the exposed surface 19.

It is possible to provide the use of motorised and/or servo assisted means for activating the handles 40 and the consequent sliding and angular shift of the semi-rings 31.

The main advantage of the filter according to the present invention stays in that it can adjust the position and the distance of the brushing element against the exposed surface maintaining it in constant pressing contact.

Thanks to the shift it is thus possible to vary, according to the need, the pressure exercised by the brushing element against the surface of the sponges.

This characteristic is particularly advantageous in the case wherein the filtering body is made of sponges or similar porous elements, which, exactly for the properties of the material they are realized with, are subject to wear mainly due to the effect of time, of the water action, and of the pressures the container undergoes. As a consequence, with the passage of time these sponges undergo a remarkable dimension decrease.

Thanks to the invention, by shifting the brushing element against the exposed surface, it is thus possible to compensate this possible dimension decrease of the filtering body due to wear.

Moreover, in the specific case wherein the shift is of angular nature the brushing element it is shifted against the surface in a simple way by means of the above control rods, without requiring complex movement members.

The shown solution also offers the advantage that a user, simply acting on the handles, can easily perform the angular shift.

Another advantage of the shown solution stays in that the same control rods used for performing the linear and alternated sliding of the two semi-rings are exploited also for performing the angular shift.

The rotation of the control rods can be also performed simultaneously to the linear to-and-from movement, and this allows combining the brushing action along the surface with the shift of the brushing elements against it, thus obtaining high manoeuvre flexibility.

The two semi-rings also offer the advantage of brushing a whole circular surface of the sponges, as if it were a single ring.

A further advantage stays in the central position of each rod with respect to the corresponding semi-ring. This allows, by rotating the rods now in a sense, now in the other, to approach to the exposed surface substantially the semi-ring inside and to obtain an almost complete brushing of the surface of the sponges.

Another advantage stays in that thanks to the flexibility of the brushing tabs it is possible to further compensate the dimension variation of the filtering elements.

Obviously a technician of the field, with the aim of meeting contingent and specific needs, will bring several changes and variations to the above described filter, all however within the scope of protection of the invention as defined by the following claims.

For example, according to a further embodiment, the control rod is fixed in an eccentric position with respect to the semi-ring in correspondence with one of the terminal portions of the brushing element. In this case, the brushing element is angularly shifted by means of rotation in a single rotation sense against the surface of the filtering body. In such a manner, the brushing element is mobile toward-and-away with respect to the exposed surface.

Spring means can be provided for maintaining the brushing element in an angularly shifted position.

It is also clear that a filter can be provided wherein the sponges have non-cylindrical shape, for example parallelepiped; in this case the brushing element will obviously have shape conjugated to the surface of the filtering body and no more ring-like shaped.

The invention claimed is:

1. Pressure filter for aquariology for retaining impurities of a liquid intended for ponds, aquaria and the like, of the type comprising:
    a beaker-like container closed by a cover;
    a liquid path extended in the container between an inlet opening and an outlet opening;
    a filtering body placed along the path and having an exposed surface whereon the impurities are retained;
    at least a brushing element mounted in the container in a guided way with a to-and-from movement along the exposed surface of the filtering body for removing the impurities, the brushing element being mobile against said exposed surface for maintaining a pressing contact between the brushing element and the exposed surface, wherein the brushing element is angularly mobile around an axis substantially parallel to said exposed surface; and
    a control rod swiveling around said axis, for angularly moving said brushing element against the exposed surface.

2. The filter of claim 1, wherein said control rod is adapted to guide said brushing element with said to-and-from movement along the exposed surface.

3. The filter of claim 2, comprising a grip handle for said control rod.

4. The filter of claim 2, comprising servo assisted motor means for the activation of said control rod.

5. The filter of claim 1, wherein the control rod is fixed in a substantially central position of said brushing element for dividing it in two portions and allowing an alternating rotation of the one and of the other portion toward-and-away with respect to the exposed surface.

6. The filter of claim 1, wherein said control rod is mounted passing through a respective calibrated hole made in the cover.

7. The filter of claim 1, wherein said control rod is fixed in an eccentric portion with respect to said brushing element in correspondence with one of the terminal portions of the brushing element.

8. The filter of claim 1, wherein said brushing element comprises on one side facing said exposed surface a plurality of flexible tabs.

9. The filter of claim 1, wherein said brushing element has a substantially semi-ring-like shape.

10. The filter of claim 9, wherein the filtering body has a substantially circular section and it is arranged in a substantially central area of the container defining an annular chamber wherein the brushing element is guided in a sliding way.

11. The filter of claim 10, comprising two semi-ring-like brushing elements placed on opposite parts with respect to the filtering body.

12. The filter of claim 11, wherein said two brushing elements substantially form a ring, which coaxially surrounds the filtering elements.

13. The filter of claim 12, wherein the ring formed by said two semi-ring-like brushing elements has a diameter smaller than the outer diameter of the filtering body.

14. The filter of claim 1, wherein said filtering body comprises sponges of polyurethane with open cells.

15. Pressure filter For aquariology for retaining impurities of a liquid, of the type comprising:
    a container;
    a filtering body having an exposed surface whereon the impurities are retained;
    at least a brushing element mounted in said container and guided along the exposed surface of the filtering body for removing the impurities; and
    a control rod, which is adapted to guide said brushing element along the exposed surface and to swivel it around said axis,
    wherein the brushing element is swiveling around an axis substantially parallel to said exposed surface so that it is alternatively moved toward-and-away with respect to said exposed surface, and
    wherein two brushing elements are provided and are arranged on opposite sides with respect to said filtering body, each of the brushing elements having a semi-ring-like shape.

16. The filter of claim 15, wherein said control rod is fixed in a substantially central position of the brushing element for dividing it in two portions and allowing an alternating rotation of the one and of the other portion toward-and-away with respect to the exposed surface.

17. The filter of claim 15, wherein said control rod is fixed in an eccentric portion with respect to the brushing clement in correspondence with one of the terminal portions of the brushing element.

18. The filter of claim 15, wherein said brushing element comprises on one side facing the surface a plurality of flexible tabs.

19. The filter of claim 15, wherein said filtering body has a substantially circular section and it is arranged in a substantially central area of the container defining an annular chamber wherein each of the semi-ring-like brushing elements is guided in a sliding way.

* * * * *